(12) United States Patent
Dessouki et al.

(10) Patent No.: US 7,604,098 B2
(45) Date of Patent: Oct. 20, 2009

(54) COULOMB FRICTION DAMPED DISC BRAKE CALIPER BRACKET

(75) Inventors: Omar S. Dessouki, Beverly Hills, MI (US); Brent D. Lowe, Milford, MI (US); Mark T. Riefe, Brighton, MI (US); Matthew T. Doescher, Berkley, MI (US); James J. Yuhas, Washington Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 254 days.

(21) Appl. No.: 11/194,228

(22) Filed: Aug. 1, 2005

(65) Prior Publication Data

US 2007/0023240 A1     Feb. 1, 2007

(51) Int. Cl.
*F16D 65/38* (2006.01)

(52) U.S. Cl. ............ 188/73.37; 188/73.36; 188/73.38; 188/378

(58) Field of Classification Search ............ 188/73.37, 188/73.35, 73.36, 73.38, 218 XL, 182, 378, 188/379, 380; D12/180
See application file for complete search history.

(56) References Cited

U.S. PATENT DOCUMENTS

| | | | |
|---|---|---|---|
| 4,194,597 A | 3/1980 | Evans et al. | |
| 4,516,658 A * | 5/1985 | Scarton et al. | 181/208 |
| 4,722,424 A | 2/1988 | Ikeuchi | |
| 4,913,592 A * | 4/1990 | Petty et al. | 405/223.1 |
| 5,099,961 A * | 3/1992 | Dreilich et al. | 188/73.35 |
| 5,394,963 A | 3/1995 | Deane et al. | |
| 5,613,577 A | 3/1997 | Collin | |
| 5,855,257 A | 1/1999 | Wickert et al. | |
| 6,505,716 B1 | 1/2003 | Daudi et al. | |
| 6,971,486 B2 * | 12/2005 | Stickney et al. | 188/73.35 |
| 7,249,658 B2 * | 7/2007 | Barrett et al. | 188/73.45 |
| 7,334,666 B2 * | 2/2008 | Nakaie et al. | 188/73.38 |
| 2006/0219490 A1 * | 10/2006 | Eisengraber et al. | 188/71.1 |

FOREIGN PATENT DOCUMENTS

| | | | | |
|---|---|---|---|---|
| DE | 4020668 A1 * | 1/1992 | | 188/73.45 |
| EP | 0811781 A2 * | 12/1997 | | |
| JP | 2-245528 A * | 10/1990 | | 188/73.31 |
| JP | 8-128469 A * | 5/1996 | | |

OTHER PUBLICATIONS

Disc Brake Squeal: Diagnosis and Prevention, SAE Publication 03NVC-224, O. Dessouki, G. Drake, B. Lowe, and W.K. Chang, 7 pages, dated 2002.
U.S. Appl. No. 10/961,813, filed Oct. 8, 2004, Dessouki et al.

* cited by examiner

*Primary Examiner*—Robert A Siconolfi
*Assistant Examiner*—Mariano Sy (57) ABSTRACT

A Coulomb friction damped disc brake caliper bracket, wherein damping is provided by Coulomb friction, most preferably at the outboard tie-bar thereof. In one form, at least one clamping member applies compressive force externally to the caliper bracket, and in a second form, at least one interfacial boundary is internally disposed in the caliper bracket. Provided thereby is a mechanically distinguishable surface boundary between two surfaces which are in mutual contact such that a state of Coulomb friction exists therebetween.

7 Claims, 7 Drawing Sheets

COULOMB FRICTION DAMPED DISC BRAKE CALIPER BRACKET

TECHNICAL FIELD

The present invention relates to disc brake caliper brackets used in automotive applications, and more particularly to Coulomb friction damped disc brake caliper brackets in which the damping is provided by either externally disposed clamping or at least one internally disposed interfacial boundary at the caliper bracket thereof.

BACKGROUND OF THE INVENTION

Motor vehicle disc brake systems utilize a disc brake unit, composed of a disc brake rotor and a disc brake caliper, at each respective wheel.

The disc brake rotor typically includes a rotor hat for connecting to an axle hub of a rotatable axle of the motor vehicle, and at least one annular rotor cheek connected to the rotor hat, wherein the at least one rotor cheek has a pair of mutually opposed braking surfaces onto which brake pads are selectively applied when braking is desired. Typically, the rotor cheek configuration may be solid, in which case a single rotor cheek has opposing braking surfaces thereon, or may be vented, in which case a pair of rotor cheeks are mutually separated by a web of ventilation vanes and each rotor cheek provides a respective braking surface so that, in combination, two mutually opposed braking surfaces are provided.

The disc brake caliper includes a generally U-shaped caliper bracket, including inboard and outboard disposed tie-bars. The caliper bracket supports a mutually opposed pair of brake pads, one brake pad disposed overlying a respective rotor cheek braking surface, wherein the caliper, the brake pads, and other associated brake components collectively form a "brake corner". Normally, the caliper keeps the brake pads separated from the braking surfaces of the one or more rotor cheeks, and braking of the motor vehicle occurs at the brake corner by hydraulically actuating the brake pads to press upon the braking surfaces of the one or more rotor cheeks. Frictional interaction between the one or more rotating rotor cheeks and non-rotating brake pads causes braking of the motor vehicle to transpire, the rate of braking depending upon the pressure of the brake pads against the braking surfaces.

Brake squeal can be undesirably generated at the brake corner when braking occurs, particularly in the low frequency range of from about 2 kHz to about 6 kHz. This brake squeal is the result of modal excitations of the disc brake rotor (composed usually of cast iron) and the disc brake caliper by the frictional interaction of the brake pads.

With regard to the disc brake rotor, it is known in the prior art that brake squeal can be addressed by reducing modal excitation on the disc brake rotor by the selection of friction material of the brake pads (ie., lowering the frictional coefficient), by modifying the modal excitation response of the brake corner via changing the modal properties of the rotor cheeks (ie., in terms of resonant frequencies, mode shapes, and structural damping through higher carbon content of the one or more rotor cheeks and/or increasing the disc brake rotor mass, or using exotic, expensive materials), and by introducing additional damping for example via a shim disposed at a backing plate of the brake pads.

With regard to the disc brake caliper, countermeasures to reduce low-frequency brake squeal include: 1) increasing the stiffness of the caliper bracket by increasing the cross-sectional area of the tie-bars, or 2) casting in or mechanically attaching a mass to the caliper bracket, wherein the mass acts as a vibration damper and/or changes the dynamic response of the caliper bracket.

The aforementioned brake squeal countermeasures are relatively effective for most brake corner designs, but they require a significant amount of testing and analytical resources in order to be effective. And unfortunately, brake corners for performance motor vehicles, or those motor vehicles with high friction lining materials, are resistant to the prior art brake squeal countermeasures, due to the high amount of modal excitation from the friction material of the brake pads.

A breakthrough in disc brake technology, which is aimed at eliminating brake squeal originating at the disc brake rotor, is described in U.S. patent application Ser. No. 10/961,813, filed on Oct. 8, 2004, assigned to the assignee hereof, wherein the entire disclosure thereof is hereby incorporated herein by reference. In this disclosure, a Coulomb friction damped disc brake rotor is described, wherein damping of the modal excitations is provided generally coextensively with the braking surfaces of the one or more rotor cheeks. In this disclosure, the Coulomb friction damped disc brake rotor has at least one interfacial boundary formed in at least one rotor cheek which is disposed in generally coextensive relation to the braking surface thereof. In this regard, by "interfacial boundary" is meant a mechanically distinguishable surface boundary between two surfaces which are in mutual contact such that a state of Coulomb friction exists therebetween, and wherein the term "Coulomb friction" represents the energy absorption processes at the interface between two material surfaces through mechanical interaction of the surfaces, as for example temperature, pressure, time, etc. In a preferred embodiment of the Coulomb friction damped disc brake rotor according to the disclosure, an insert is disposed in at least one rotor cheek of a disc brake rotor having either a solid or vented rotor cheek configuration, wherein the insert provides mutually opposed interfacial boundaries with respect to the surrounding rotor cheek, and wherein the insert is annularly configured and disposed generally coextensively with a braking surface of the rotor cheek. Alternatively, a plurality of inserts may be provided in the one or more rotor cheeks. Alternatively further, the interfacial boundary may be provided by an interstice formed in the rotor cheek in which the surfaces of rotor cheek which define the interstice mutually form therebetween the interfacial boundary, wherein any number of interstices may be provided in one or more rotor cheeks.

What remains needed in the art is to somehow provide damping of the disc brake caliper bracket, so as to eliminate brake squeal at the disc brake corner.

SUMMARY OF THE INVENTION

The present invention is a Coulomb friction damped disc brake caliper bracket, wherein damping of the modal excitations is provided, and wherein the term "Coulomb friction" represents energy absorption processes at an interface between two material surfaces through mechanical interaction of the surfaces, as for example temperature, pressure, time, etc.

The Coulomb friction damped disc brake caliper bracket according to the present invention has, in a first preferred embodiment thereof, one or more clamping members exteriorly clamped onto the caliper bracket so as to provide a compressive force thereto. Preferably, the one or more clamping members are disposed at one or both of the inboard and outboard tie-bars, and most preferably disposed at the outboard tie-bar. In this regard, the expected low frequency brake squeal control by Coulomb damping provided by the one or more clamping members is expected to be proportional to the magnitude of the compressive force exerted by the one or more clamping members and also proportional to the area of clamping of the one or more clamping members. By way of exemplification, a plurality of clamping members may be integrally interconnected to form a "multi-clamping body", wherein the multi-clamping body is preferably clipped onto the outboard tie-bar.

The Coulomb friction damped disc brake caliper bracket according to the present invention has, in a second preferred embodiment thereof, at least one interfacial boundary internally formed in the caliper bracket, preferably, at one or both of the inboard and outboard tie-bars, and most preferably disposed at the outboard tie-bar. In this regard, by "interfacial boundary" is meant a mechanically distinguishable surface boundary between two surfaces which are in mutual contact such that a state of Coulomb friction exists therebetween. In this regard, it is further believed that the at least one interfacial boundary has the following attributes: 1) the greater the surface area of the interfacial boundaries, the greater will be the damping; 2) the greater the number of interfacial boundaries, the greater will be the damping; 3) pre-tensioning and/or pre-loading is not required so long as the interfacial boundary provides Coulomb friction damping; and finally, 4) the thickness of the insert may be optimized based upon experimentation (ie., a smallest possible thickness while still providing at least one interfacial boundary), and it is thought to be optimal if the thickness of the insert is small relative to the thickness of the tie-bar. By way of exemplification, at least one insert is disposed in a respective at least one slot formed in the outboard tie-bar, wherein the at least one insert provides mutually opposed interfacial boundaries with respect to the surrounding caliper bracket.

Accordingly, it is an object of the present invention to provide a Coulomb friction damped disc brake caliper bracket.

This and additional objects, features and advantages of the present invention will become clearer from the following specification of a preferred embodiment.

DESCRIPTION OF THE PREFERRED EMBODIMENT

Referring now to the Drawing, FIGS. 1 through 10 depict various aspects of an example of a Coulomb friction damped disc brake caliper bracket 100 for motor vehicle disc brake applications according to a first embodiment of the present invention, wherein one or more clamping members are externally interfaced with the brake caliper bracket; and FIGS. 11 through 13B depict various aspects of an example of a Coulomb friction damped disc brake caliper bracket 200 for motor vehicle disc brake applications according to a second embodiment of the present invention, wherein one or more interfacial boundaries are internally interfaced with the brake caliper bracket.

Attention will now be directed to the Coulomb friction damped disc brake caliper bracket 100 for motor vehicle disc brake applications according to the first embodiment of the present invention.

Figure 1:
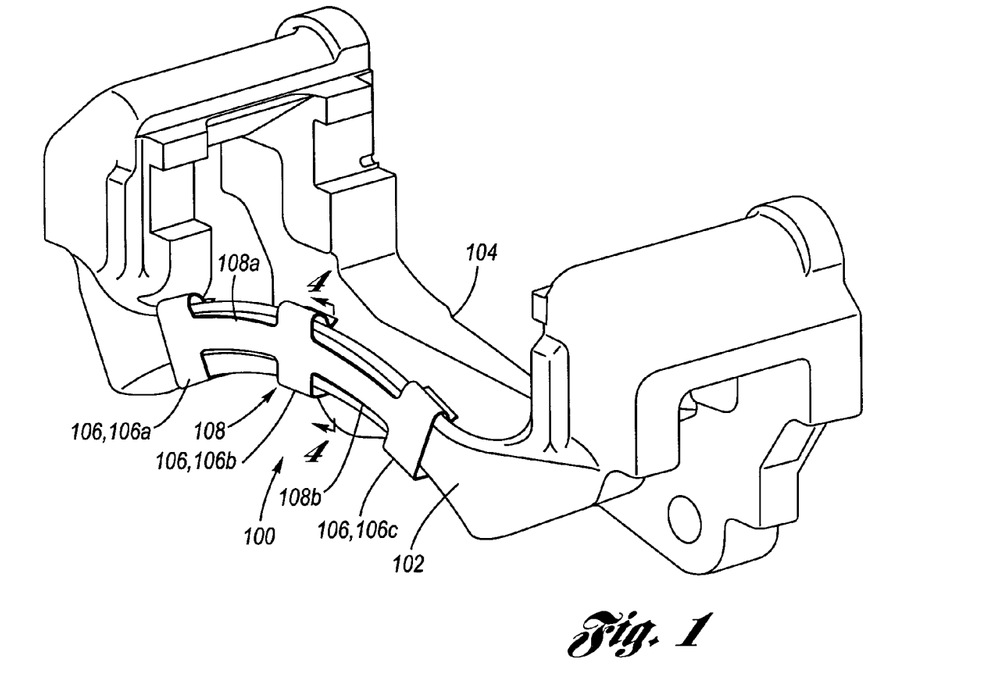
FIG. 1 is a perspective view of the Coulomb friction damped disc brake caliper bracket according to a first preferred embodiment of the present invention, wherein a multi-clamping body is clipped onto the outboard tie-bar.
Figure 2:
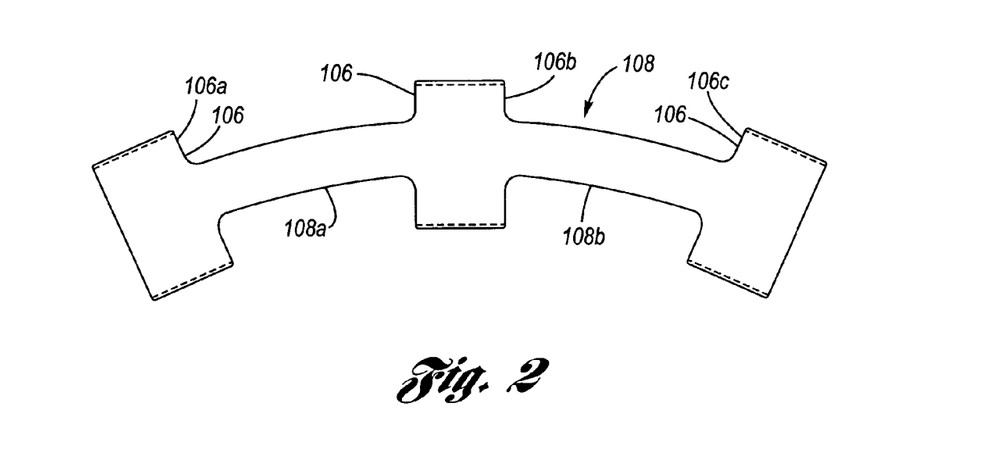
FIG. 2 is a plan view of the clamping body of FIG. 1.
Figure 3:
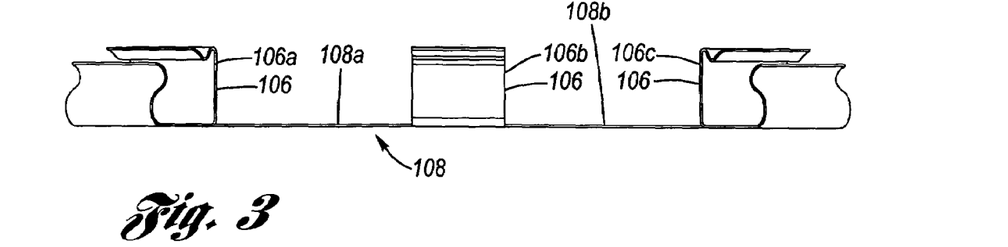
FIG. 3 is a side view of the clamping body of FIG. 1.

In a disc brake caliper of a disc brake corner, FIGS. 1 through 4 depict a non-limiting example of a Coulomb friction damped disc brake caliper bracket 100, which may be shaped differently from that shown at FIG. 1, and which includes an outboard tie-bar 102 and an inboard tie-bar 104.

A plurality of clamping members 106 (three clamping members 106*a*, 106*b*, 106*c* being shown merely by way of example in FIG. 1) are clamped externally onto the outboard tie-bar 102. As shown best at FIG. 4, each clamping member 106 includes at least one pair of mutually opposed clamp jaws 110 (an upper pair of clamp jaws 110*a* and a lower pair of clamp jaws 110*b* being shown by example at FIG. 4) which are respectively connected to a resilient wall 106*d*, 106*d'*. When the clamp jaws 110 of each clamp jaw pair are placed onto the outboard tie-bar, the clamp jaws are forced to expand apart, whereby the resiliency of the resilient wall 106*d*, 106*d'* causes the clamp jaws to mutually exert a compression force F to the sidewalls 102a of the outboard tie-bar 102.

It is preferred to provide a structure for interconnecting a plurality of clamping members 106. As shown at FIGS. 1 through 4, the clamping members 106a, 106b, 106c are integrally interconnected as a single piece multi-clamp body 108, wherein links 108a, 108b provide, respectively, the integral interconnection of mutually adjacent clamping members 106.

Figure 4:
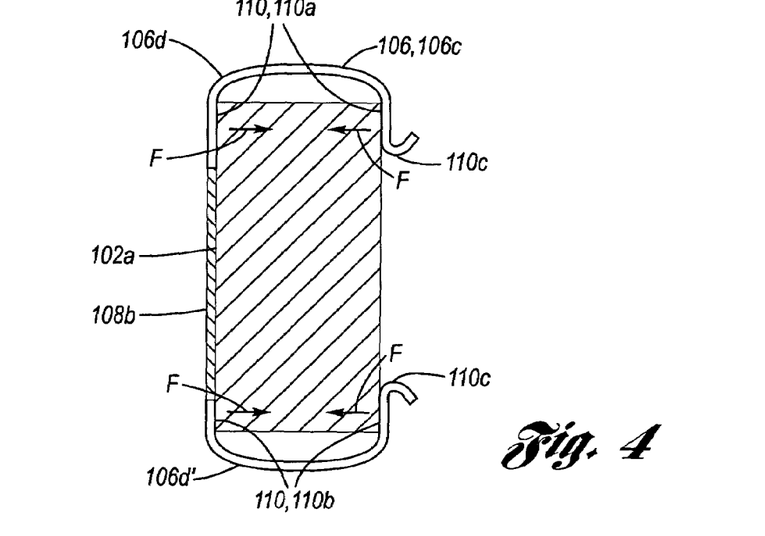
FIG. 4 is a sectional view, seen along line 4-4 of FIG. 1, wherein the compression force applied to the tie-bar sidewalls.

As can be discerned best from FIG. 4, the multi-clamping body 108 is clipped onto the outboard tie-bar 102 such that each of the clamping members 106 clamps to the outboard tie-bar and applies compressive forces F to the sidewalls 102a of the tie-bar. For ease of clipping the clamping members 106 onto the tie-bar 102, the upper and lower clamp jaws 110a, 110b have up-turned edges 110c to facilitate initial, expanding engagement with the outboard tie-bar 102.

Figure 5:
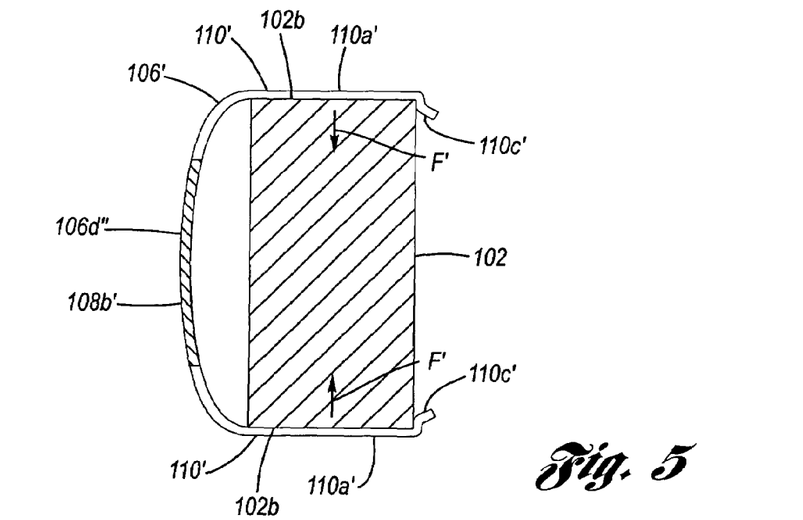
FIG. 5 is a sectional view similarly taken as at FIG. 4, but wherein now the multi-clamping body has been modified so that the compression force is applied to the tie-bar endwalls.

Referring now to FIG. 5, an alternative clamping member 106' is depicted wherein the modality of applying compression force F' is applied perpendicular to the direction of the applied compression force F of FIG. 4, and wherein a plurality of clamping members 106' may be integrated into a multi-clamping body via the aforementioned links 108b'. In this regard, the clamp jaws 110a', 110a', which may include the aforementioned up-turned ends 110c', of a pair of clamp jaws 110', are respectively connected by a resilient wall 106d'''. When the clamp jaws 110a' are placed onto the outboard tie-bar, the clamp jaws are forced to expand apart, whereby the resiliency of the resilient wall 106d''' causes the clamp jaws to mutually exert a compression force F' to the endwalls 102b of the outboard tie-bar 102.

Figure 6:
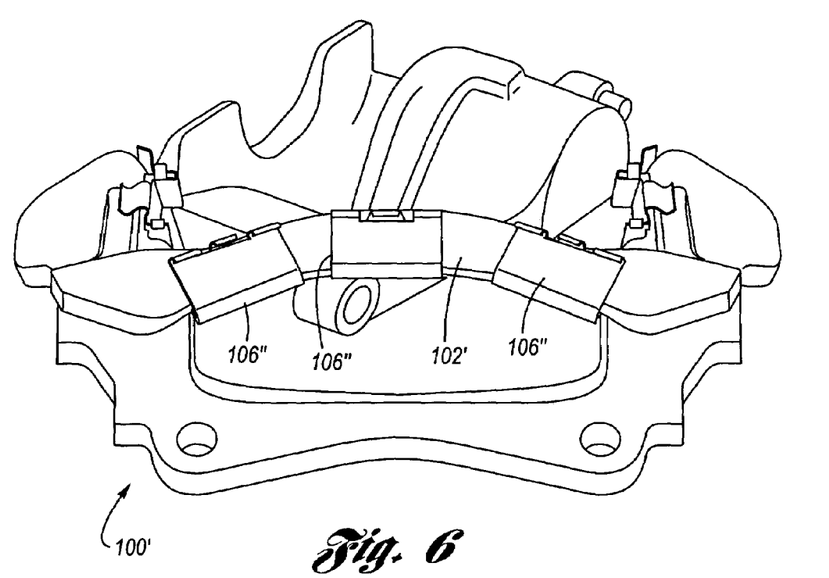
FIG. 6 is a perspective view of a Coulomb friction damped disc brake caliper bracket, wherein three discrete clamping members are clamped to the outboard tie-bar thereof.

FIG. 6 is a view of a conventional caliper bracket to which was selectively clamped three discrete clamping members 106'' to thereby provide a Coulomb friction damped caliper bracket 100' for testing (see FIGS. 7 through 10), wherein the testing was with and without the clamping members. The clamping members 106'' were provided by utilizing large size binder clips (available through Charles Leonard, Inc., Glendale, N.Y.), wherein the wire handles had been removed. The compression force applied to the outboard tie-bar 102' by each of the clamping members 106'' was about 40 N.

Figure 7:
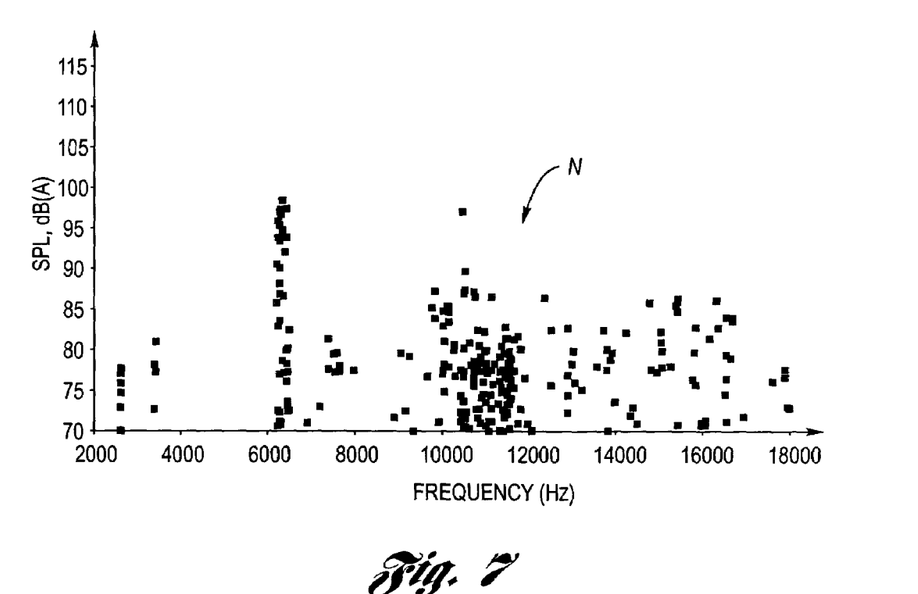
FIG. 7 is a plot of brake squeal of the disc brake caliper bracket of FIG. 6 without the clamping members.
Figure 8:
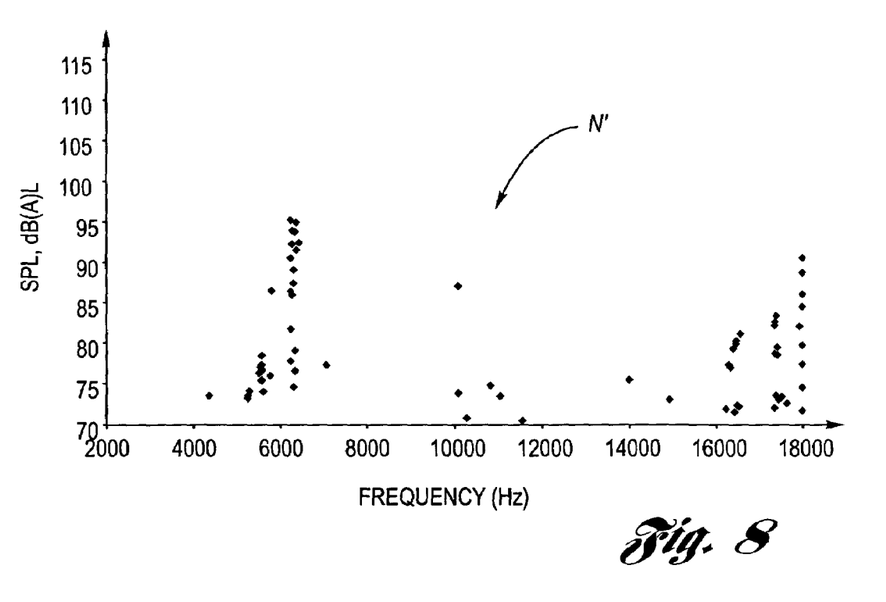
FIG. 8 is a plot of brake squeal of the disc brake caliper bracket of FIG. 6 as shown and with the clamping members.

FIGS. 7 and 8 show comparative brake corner noise data obtained utilizing a brake noise dynamometer of the Coulomb friction damped caliper bracket 100' and the caliper bracket without Coulomb friction damping (ie., without the clamping members 106''), referred to as the "baseline" caliper bracket. The resulting test plots were generated by utilizing identical test procedures, dynamometers and brake corners for each. The noise plot N depicted in FIG. 7 is that of the baseline caliper bracket and has a magnitude indicating the brake corner is noisy in the warm section. In contradistinction, noise plot N' of the Coulomb friction damped caliper bracket 100' depicted in FIG. 8 shows a quiet brake corner in the warm section. The difference between the noise plots N, N' was due to the high level of damping occurring only at the Coulomb friction damped caliper bracket 100' according to the present invention.

Figure 9:
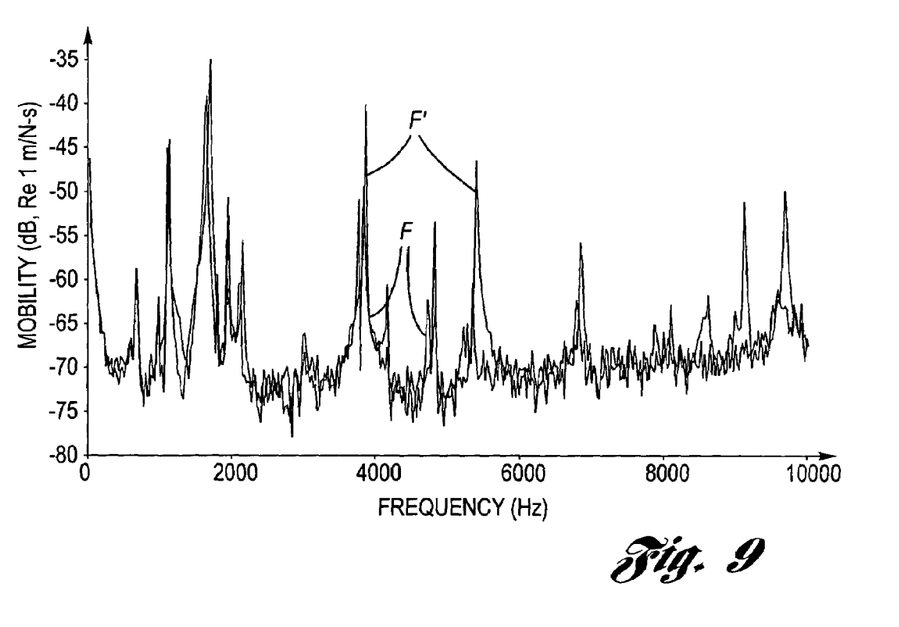
FIG. 9 is a comparative set of plots for frequency response functions of the Coulomb friction damped disc brake caliper bracket of FIG. 6, with and without the clamping members, wherein the plots are of vibrational frequency versus mobility.

FIG. 9 shows frequency response function (FRF) test plots comparatively of the FRF plot F for the Coulomb friction damped caliper bracket 100' and of the FRF plot F' of the baseline caliper bracket. It will be seen that the Coulomb friction damped caliper bracket 100' had a greater than one order of magnitude increase in damping (loss factor) as compared to that of the baseline caliper bracket. Again, this result is attributed to the damping occurring only in the Coulomb friction damped caliper bracket 100' according to the present invention.

Figure 10:
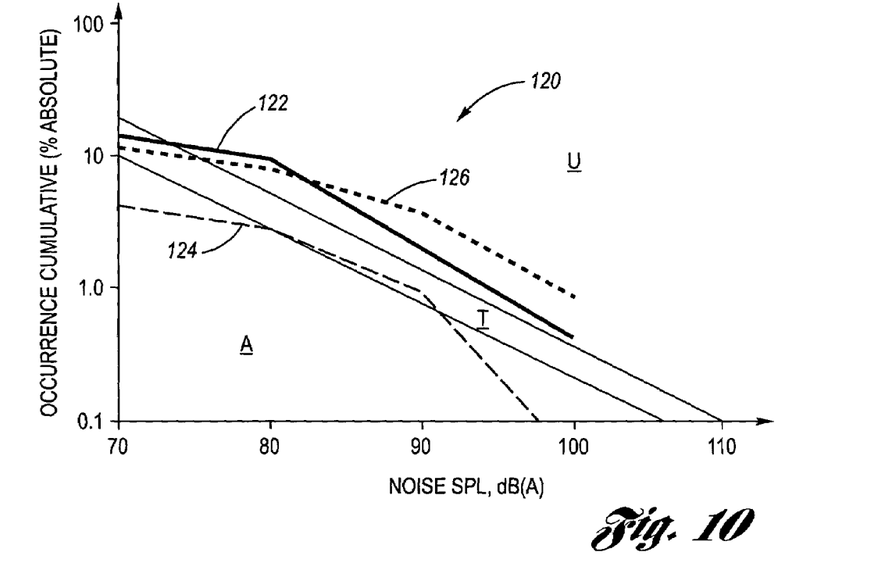
FIG. 10 is a plot of dynamometer testing results of the number noise occurrences versus sound pressure level of the Coulomb friction damped disc brake caliper bracket of FIG. 6, with and without the clamping members.

FIG. 10 is a graph 120 of cumulative noise occurrences versus sound pressure level, including regions of acceptability A, unacceptability U, and transition T therebetween for a brake corner. Plot 122 is for the baseline caliper bracket, plot 124 is for the Coulomb friction damped caliper bracket 100' (wherein the mounting members 106'' were added), and plot 126 is for the baseline caliper bracket (wherein the clamping members 106'' have been removed from the Coulomb friction damped caliper bracket to thereby return to the baseline caliper bracket for the test). A clear acceptability is seen in the Coulomb friction damped caliper bracket 100' that is not present in the baseline caliper bracket.

Attention will next be directed to the Coulomb friction damped disc brake caliper bracket 200 for motor vehicle disc brake applications according to the second embodiment of the present invention.

Figure 11:
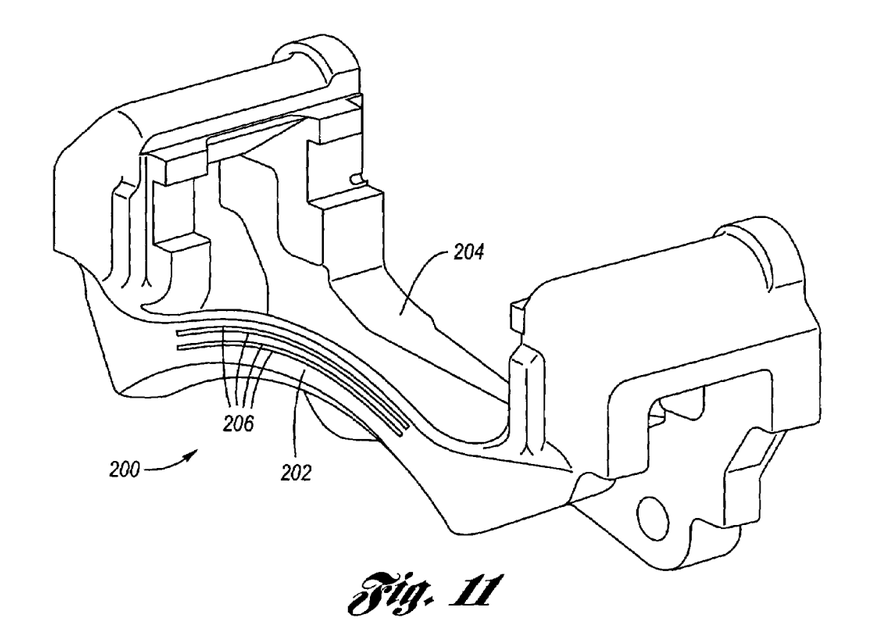
FIG. 11 is a perspective view of the Coulomb friction damped disc brake caliper bracket according to a second preferred embodiment of the present invention, wherein one or more interfacial boundaries are internal to the outboard tie-bar.
Figure 12A:
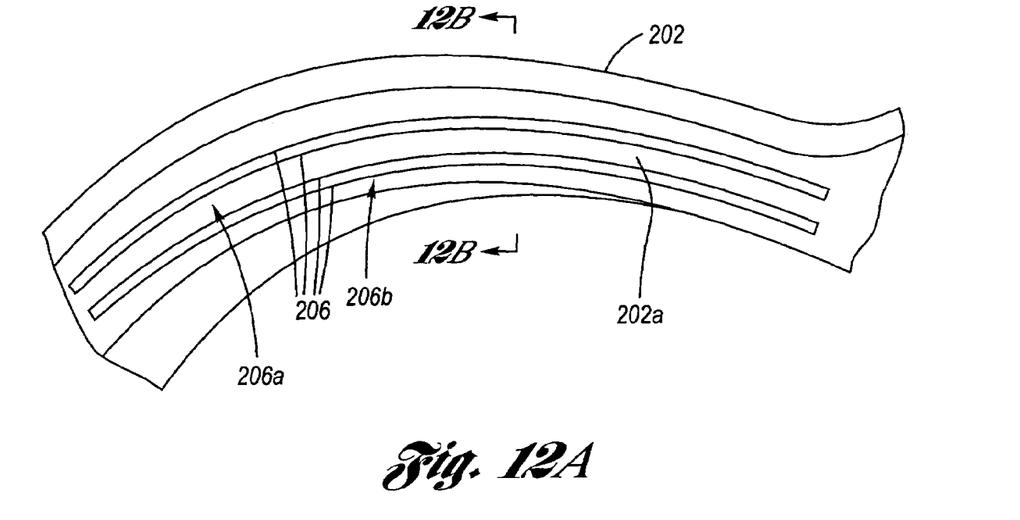
FIG. 12A is a broken-away side view of the outboard tie-bar of a Coulomb friction damped caliper bracket, wherein a pair of inserts are provided in a sidewall thereof.
Figure 12B:
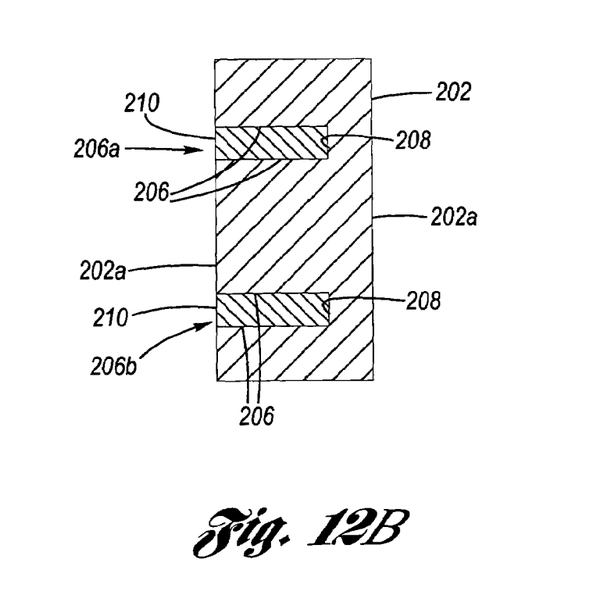
FIG. 12B is a sectional view seen along line 12B-12B of FIG. 12A.

In a disc brake caliper of a disc brake corner, FIGS. 11 through 12B depict a non-limiting example of a Coulomb friction damped disc brake caliper bracket 200, which may be shaped differently from that shown at FIG. 11, and which includes an outboard tie-bar 202 and an inboard tie-bar 204.

At least one interfacial boundary 206 is internal to the outboard tie-bar 202, wherein two pairs interfacial boundaries 206a, 206b are shown merely by way of exemplification at FIGS. 11 through 12B. Each of the interfacial boundaries 206 is formed in the sidewall 202a of the outboard tie-bar 202, and may extend a selected length along the outboard tie-bar, which length may include being as long as substantially all the length thereof. Each pair of interfacial boundaries 206a, 206b in this exemplification is composed of a slot 208 and an insert 210 received within the slot, wherein each insert 210 provides a pair of oppositely disposed interfacial boundaries between the insert and the outboard tie-bar. Each interfacial boundary 206 has a mechanically distinguishable surface boundary between two surfaces which are in mutual contact such that a state of Coulomb friction exists therebetween.

Figure 13A:
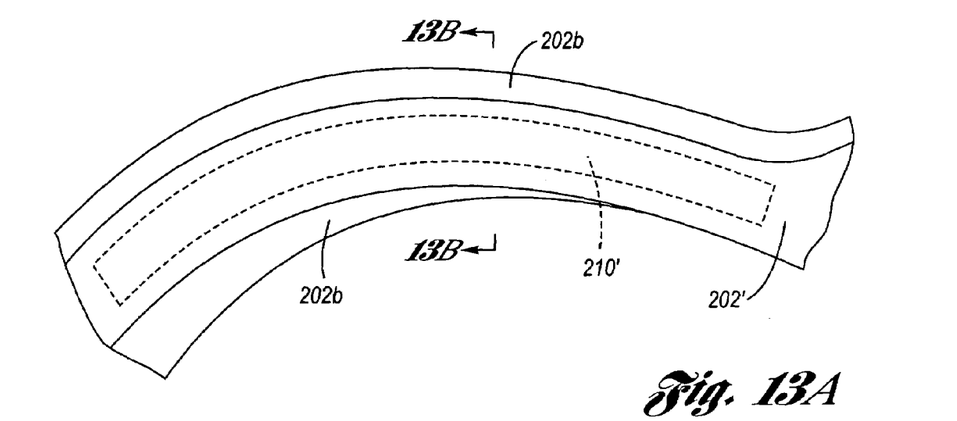
FIG. 13A is a broken-away side view of the outboard tie-bar of a Coulomb friction damped caliper bracket, wherein an insert is provided in an endwall thereof.
Figure 13B:
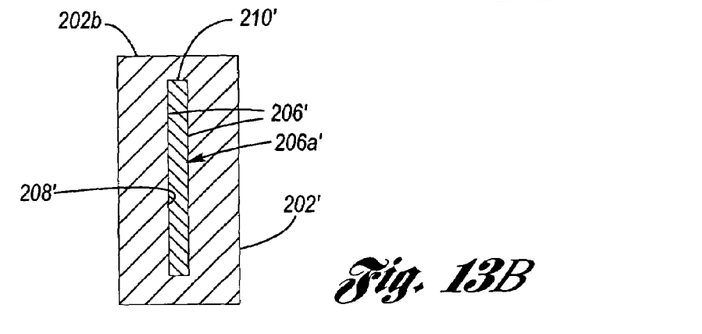
FIG. 13B is a sectional view seen along line 13B-13B of FIG. 13A.

Referring now to FIGS. 13A and 13B at least one interfacial boundary 206' (a pair of interfacial boundaries 206a' being shown by way of example) is now formed in an endwall 202b of the outboard tie-bar 202'. The pair of the interfacial boundaries 206a' in this exemplification is composed of a slot 208' and an insert 210' received within the slot and embedded within the outboard tie-bar 202', wherein the insert 210' provides a pair of oppositely disposed interfacial boundaries between the insert and the outboard tie-bar. Each interfacial boundary 206' has a mechanically distinguishable surface boundary between two surfaces which are in mutual contact such that a state of Coulomb friction exists therebetween.

Examples of manufacturing methodologies are described in the aforementioned U.S. patent application Ser. No. 10/961,813, which methodologies are applicable to the present invention. For example, the outboard tie-bar may be cast so as to encapsulate the insert, an anchorage for the insert may be provided, or, indeed, the insert obviated by providing an interstice formed in the outboard tie-bar, wherein the surfaces of the outboard tie-bar define the interstice and mutually form an interfacial boundary whereat Coulomb friction is present. As further discussed in U.S. patent application Ser. No. 10/961,813, the interfacial boundaries can be formed by machining or casting the slot into a sidewall or endwall of the outboard tie-bar and then pressing therein the insert, or molten metal of a preselected composition to maximize damping and ease of casting being molded by being cast or injected into the slot, or a high temperature polymer, a metal powder, or a ceramic paste being molded by injection into the slot.

Figure 14A:
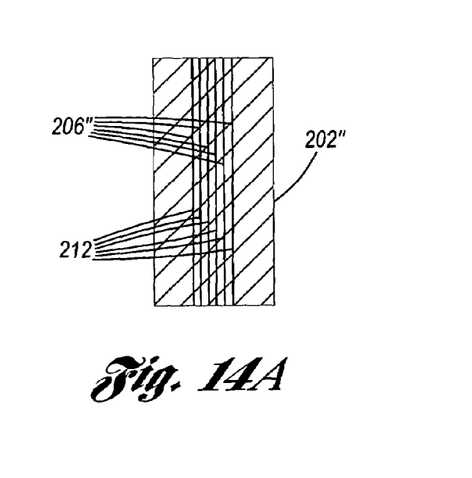
FIG. 14A is a sectional view of the outboard tie-bar of a Coulomb friction damped caliper bracket, similar to those taken at FIGS. 12B and 13B, wherein a plurality of interstices are provided.
Figure 14B:
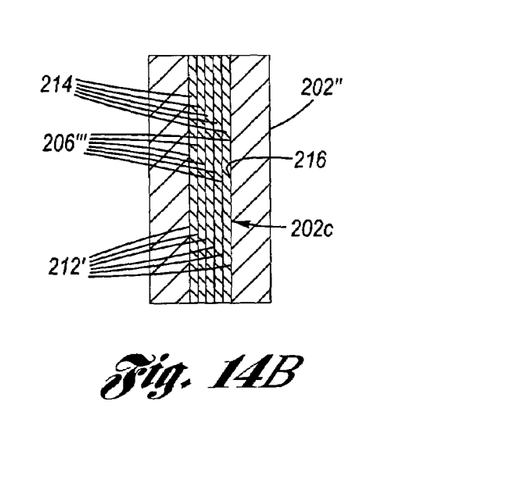
FIG. 14B is a sectional view of the outboard tie-bar of a Coulomb friction damped caliper bracket, similar to those taken at FIG. 14A, wherein a plurality of interstices provided a laminate structure of the tie-bar.

FIG. 14A depicts an example of a Coulomb friction damped brake caliper bracket, wherein the outboard tie-bar 202" thereof has a plurality of interstices 212 which provide a plurality of interfacial boundaries 206", and wherein the interstices 212 are be provided in the outboard tie-bar in any manner, as for example as described hereinabove. FIG. 14B depicts another example of a Coulomb friction damped brake caliper bracket, wherein now the outboard tie-bar 202''' thereof has a laminate structure 202c. In this regard, a plurality of interfacial boundaries 206''' is provided by a plurality of interstices 212'. The interstices 212' are be provided, for example, by mechanically pressing a stack of plates 214 into a cavity 216 of the tie-bar 202'''.

It is to be understood that all the variations of Coulomb friction damped caliper bracket exemplified above may be mixed and varied.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A Coulomb friction damped disc brake caliper bracket, comprising:
   at least one clamping member externally disposed with respect to said caliper bracket, said clamping member abutting only said caliper bracket and applying a directly opposed compression force to said caliper bracket;
   wherein a state of Coulomb friction exists between said caliper bracket and said at least one clamping member; and
   wherein each clamping member comprises:
      at least one set of opposed clamp jaws; and
      a resilient wall connected respectively to each said of mutually opposed clamp jaws;
      wherein the resiliency of said resilient wall provides said directly opposed compression force when the clamp jaws of said at least one set of clamp jaws are spread mutually apart.

2. The Coulomb friction damped disc brake caliper bracket of claim 1, wherein said caliper bracket comprises an outboard tie-bar;
   wherein said at least one clamping member applies the compression force to said outboard tie-bar.

3. The Coulomb friction damped disc brake caliper bracket of claim 2, wherein said at least one clamping member comprises a plurality of clamping members.

4. The Coulomb friction damped brake caliper bracket of claim 3, further comprising a single piece multi-clamping body, comprising:
   said plurality of clamping members; and
   at least one link, each link respectively integrally connecting adjacent clamping members of said plurality of clamping members.

5. The Coulomb friction damped brake caliper bracket of claim 4, wherein said multi-clamping body is clipped onto said outboard tie-bar.

6. The Coulomb friction damped disc brake caliper bracket of claim 1, wherein said at least one clamping member comprises a plurality of clamping members.

7. The Coulomb friction damped brake caliper bracket of claim 6, further comprising a single piece multi-clamping body, comprising:
   said plurality of clamping members; and
   at least one link, each link respectively integrally connecting adjacent clamping members of said plurality of clamping members.

* * * * *